United States Patent [19]

Herbst

[11] Patent Number: 5,840,222
[45] Date of Patent: Nov. 24, 1998

[54] METHOD FOR INJECTION-MOLDING WORKPIECES

[76] Inventor: Richard Herbst, Freisinger Strasse 3b, D-85386 Eching, Germany

[21] Appl. No.: 786,381

[22] Filed: Jan. 16, 1997

[30] Foreign Application Priority Data

Jan. 16, 1996 [DE] Germany .................. 196 01 280.5

[51] Int. Cl.$^6$ .................................................. B29C 45/64
[52] U.S. Cl. .................... 264/39; 264/40.1; 264/40.5; 425/138; 425/150; 425/590
[58] Field of Search ................ 264/39, 40.1, 40.5; 425/138, 150, 590

[56] References Cited

U.S. PATENT DOCUMENTS 5,425,905  6/1995  Herbst ........................... 264/39

*Primary Examiner*—Laurie Scheiner
*Attorney, Agent, or Firm*—Knobbe, Martens, Olson & Bear, LLP

[57] ABSTRACT

A method for injection-molding workpieces in a mold of an injection-molding machine is disclosed. The method provides a means of conducting test cycles during the initial setup of the machine at reduced speed. In a multi-cavity mold all of the workpieces are demolded by means of a handling system having a workpiece carrier system receiving and holding all workpieces in a regular pattern. The workpieces are inspected on the workpiece carrier system for determining whether all of the cavities have been filled with plastic material and whether the workpieces are of a predetermined quality. If this is not the case, the necessary adjustments are made and the test cycle is repeated. If all of the workpieces are of a predetermined quality, the machine is switched to automatic production at high nominal speed.

12 Claims, 3 Drawing Sheets

METHOD FOR INJECTION-MOLDING WORKPIECES

FIELD OF THE INVENTION

The invention relates to a method for injection-molding workpieces in a mold of an injection-molding machine. More specifically, the invention relates to a method of the aforementioned kind utilizing an injection-molding machine being adapted to be operated either at a nominal speed for the production of the workpieces or at a reduced speed during at least one test cycle for the initial setup of the machine.

Still more specifically, the invention relates to such a method utilized on an injection-molding machine operating in various subsequent phases. In a first phase during the initial setup of the machine workpieces are test-molded and, after opening the injection mold the workpieces are demolded and inspected. If the inspection shows that the workpieces are of a predetermined quality, then the molding machine is subsequently operated at an increased speed, namely at the nominal operating speed in a second operating phase of the machine. In the second phase the workpieces are produced at nominal speed without any inspection of the workpieces.

BACKGROUND OF THE INVENTION

During the injection-molding of workpieces problems may occur in that during the initial setup of the machine the machine must be properly set before the machine may be operated at its high operating speed in an automatic production mode. This problem occurs particularly when operating plastic material injection-molding machines having molds with a plurality of cavities, thus producing a corresponding plurality of workpieces during each injection cycle.

During the setup of the machine malfunctions of various kinds may occur. Such a malfunction may, for example, be caused in that the plastic material to be injected is not yet at its full operating temperature and is not injected in sufficient quantity into all of the various cavities in the mold. In particular, this may be caused by the mold being not yet at its full operating temperatures in its peripheral sections.

If such malfunctions occur during the setup of the machine, this results in some of the cavities to be only partially repleted with molten plastic material or remaining void at all. Correspondingly, no or imperfect workpieces will be demolded, when the mold is opened and the workpieces will be demolded, when the mold is opened and the workpieces are ejected by appropriate ejector pins. If a workpiece is incompletely injected, then it may happen that the workpiece is titled and jammed during the ejection phase and, hence, may not be ejected at all. If the mold is then closed again for the subsequent injection cycle, then collisions or damages may occur.

It is, further, well-known to use robatic handling systems for the demolding and/or the unloading of workpieces from multi-cavity molds. Such handling systems may be provided with so-called workpiece carrier systems. The term "workpiece carrier system" is to be understood to mean a support for a plurality of workpieces. When a workpiece carrier system is used together with a handling system, one can unload all of the workpieces from all of the cavities simultaneously as soon as the mold is opened. The workpiece carrier system may either approach the cavities in the opening direction of the mold and then unload the workpieces from the cavities or, as an alternative, the workpiece carrier system may just enter the air gap between the mold portions from a lateral direction and the workpieces are then transferred from the cavities to the workpiece carrier system by e.g. displaceable ejector pins.

It is general practice that for the initial setup of an injection-molding machine the person setting up the machine will first initiate some test cycles "by hand." This means that a handling system of the afore-described kind will remain out of operation for the time being and, in a first injection cycle the cavities within the mold will be repleted with plastic material. The mold will then be opened and the workpieces will be ejected by means of the ejector pins. In the absence of a handling system or a workpiece carrier system the workpieces will fall downwardly into an appropriate container under the action of gravity. The person setting up the machine can now optically inspect whether the workpieces are of a certain desired quality and can check whether there are as many workpieces in the container as are cavities in the mold. Depending on the outcome of this inspection, the person will then initiate one or several more test cycles until he determined that workpieces of the desired quality are manufactured in all of the mold cavities.

Only in case the inspection was thus successful, the handling system will be switched into operation and will act to unload workpieces from the mold during subsequent cycles.

Also during this subsequent phase of the setting up procedure the molding machine may still be operated at reduced speed of the machine and of the handling system, as described in U.S. Pat. No. 5,425,905 (Herbst). If it finally turns out that all components operate properly, then the person may switch the machine to an automatic production mode in which the machine is operated at full operating speed.

As can easily be seen, the setting-up of an injection-molding machine in this conventional manner is relatively tiresome and requires substantial time, in particular if the mold comprises a large quantity of cavities and, hence, workpieces to be inspected by hand during each test cycle. For doing so, the operator must pick up the container from the bottom of the machine, must count the workpieces and must bring them into a position by hand in which he may optically inspect same and then dispose of.

It is, therefore, an object underlying the invention to improve a method of the kind specified at the outset enabling to drastically reduce the time required for initially setting up an injection-molding machine.

SUMMARY OF THE INVENTION

These and other objectives underlying the invention are achieved by the following steps:

(a) during the test cycle of the machine closing the mold and injecting molten plastic material into cavities of the mold;

(b) opening the mold at the reduced speed;

(c) demolding the workpieces from the mold by means of a handling system, the handling system having a workpiece carrier system for supporting the workpieces;

(d) holding the handling system stationary for a predetermined period of time;

(e) inspecting the workpieces on the handling system during the period of time for determining whether the workpieces are of a predetermined quality;

(f) if the inspection shows that the workpieces are not of the predetermined quality, repeating steps a) through e);

(g) generating a signal when the workpieces are of the predetermined quality; and (h) continuously operating the machine at the nominal speed.

The object underlying the invention is thus entirely achieved.

If the handling system comprising the workpiece carrier system is used already during the initial setting up of the plastic material injection-molding machine, the operator may much easier inspect the condition of the workpieces. The workpieces are namely arranged on the workpiece carrier system in a regular pattern and may be optically inspected without necessitating to orient each and every workpiece individually for inspecting same. Therefore, it becomes immediately apparent on the workpiece carrier system, if one of the workpieces is missing when the corresponding cavity has not been filled with plastic material at all. All this is achieved by a surprisingly simple measure, namely the utilization of the workpiece carrier system, already during the setting up of the machine. It is only necessary to hold the workpiece carrier system stationary in a predetermined position or in several predetermined positions so that the operator may effect an optical or other control on the workpieces.

All this may be integrated into conventional plastic material injection-molding machines having a handling system without incurring bigger problems because only limited modifications on the machine control are required. Nevertheless, the invention results in a drastic reduction of the setting up time so that the output of the machine may be increased correspondingly.

In a preferred embodiment of the invention, the workpiece carrier system is held stationary in a position between two mold portions.

This has the advantage that only minimum modifications of the control are required. The workpieces may be inspected immediately after demolding when they are still within the mold, i.e., between the opened mold portions of a conventional injection mold.

In a particularly preferred embodiment of the invention the mold portions are opened during the test cycle by a first distance from each other and are opened during production at the nominal speed by a second distance from each other, the second distance being smaller than the first distance.

This has the advantage that only during the setting up of the machine the opening stroke of the mold portions must be set somewhat larger in order to allow a better and a more reliable inspection of the workpieces by the operator. As soon as the first phase is terminated, the opening stroke may be reduced accordingly at elevated operating speed and, hence, at reduced cycle time of the machine.

Moreover, it is possible to hold the workpiece carrier system stationary at a position laterally outside of the mold.

This had the advantage that a still improved inspection of the workpieces or any other control of the workpieces by means of measuring instruments or the like becomes possible.

In certain embodiments of the invention the workpieces are inspected optically.

This has the advantage that the inspection may be made by the operator himself or by means of simple measuring instruments.

In other embodiments of the invention step (c) comprises attracting the workpieces to the workpiece carrier system by means of an external attracting force, the method comprising the further step of monitoring the external attracting force.

This has the advantage that an almost fully automatic inspection of the workpieces becomes possible, in particular with respect to the question whether there are workpieces at all of the positions on the workpiece carrier system. Hence, one may simply and automatically determine whether all mold cavities have been repleted with plastic material.

In a preferred variation of this embodiment of the workpieces are attracted by means of a vacuum, the vacuum being monitored in a duct system incorporated in the workpiece carrier system.

This has the advantage that a particularly simple monitoring becomes possible. If, for example, one mold cavity was not repleted with plastic material, and hence, the corresponding position on the workpiece carrier system is not provided with a workpiece, air may freely flow into the duct system, effecting that the vacuum within the duct system will deviate from a predetermined nominal value. This deviation may be detected by means of a pressure sensor and may easily be communicated to an error detection system.

It is highly preferred if the handling system is displaced along a plurality of axes.

This has the advantage that the mold itself may be designed less complicated.

According to another embodiment of the invention, step (c) comprises ejecting the workpieces from the mold and transferring same to the workpiece carrier system.

Although the mold must be designed somewhat more complicated in this case, the workpiece carrier system needs to enter into the mold only in a radial direction with respect to the opening axis of the mold. Hence, the motion control of the workpiece carrier system is simplified.

According to other embodiments of the invention, step (f) comprises gradually increasing the reduced speed for subsequent test cycles, the gradually increased speed being smaller than the nominal speed.

This has the advantage that potential sources of errors may be detected and deleted one after the other so that the setting up of the molding machine may be effected particularly safely.

Further advantages will become apparent from the description and the enclosed drawings.

It goes without saying that the aforementioned features as well as those features that will be described in more detail below may not only be used in the particularly given combination but also alone or in other combinations without leaving the scope of the present invention.

BRIEF DESCRIPTION OF THE DRAWINGS

A preferred embodiment of the invention is shown in the drawings and will be described in more detail in the subsequent description.

DETAILED DESCRIPTION OF THE PREFERRED EMBODIMENT

Figure 1:
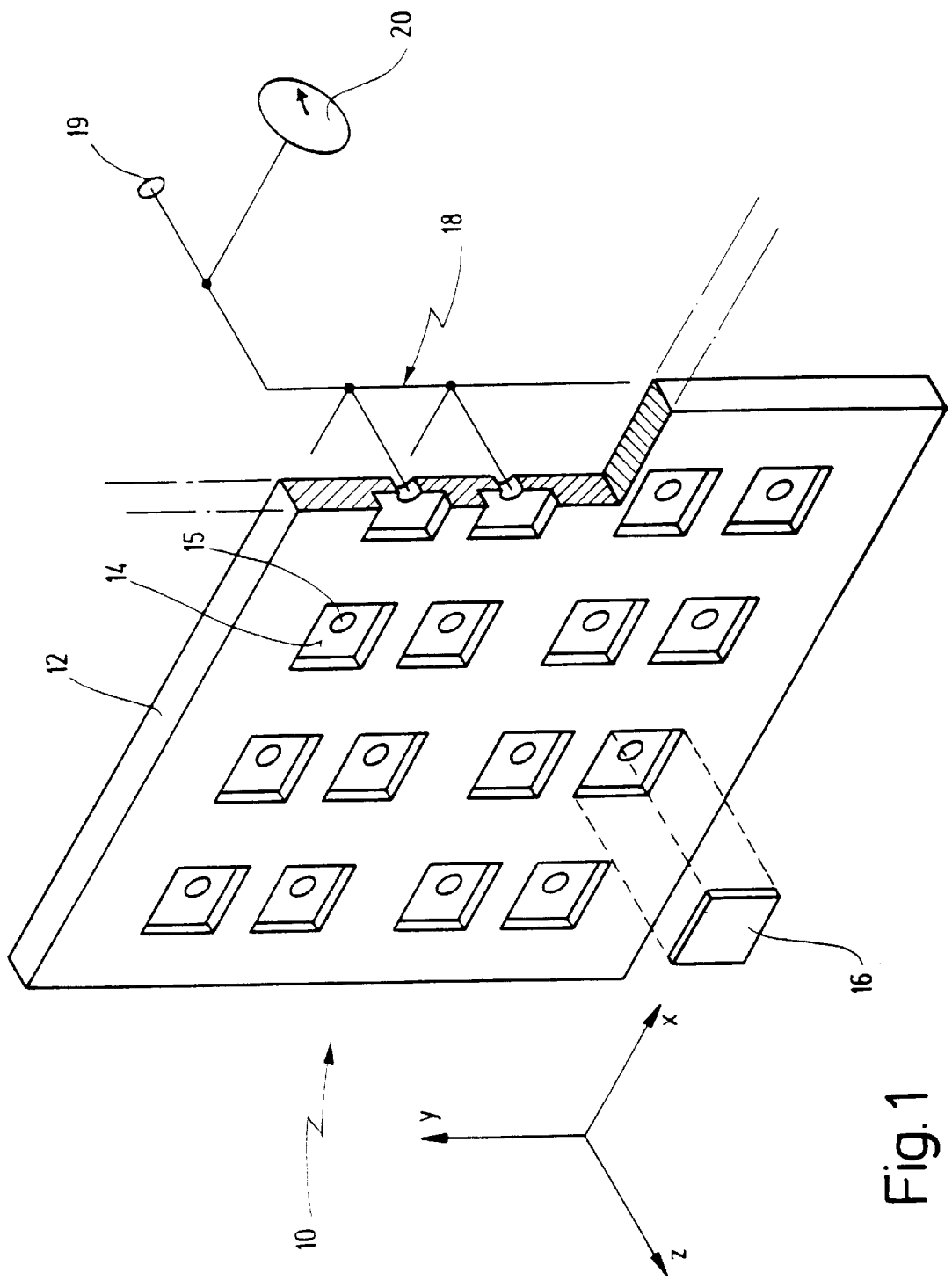
FIG. 1 is a perspective simplified view of a workpiece carrier system as may be used for carrying out the method according to the present invention.

In FIG. 1 reference numeral 10 generally indicates a workpiece carrier system as may be used in a handling system of a conventional plastic material injection-molding machine. Plastic material injection-molding machines as are of interest in connection with the present invention, are general prior art and, hence, need not be described in further detail.

Workpiece carrier system 10 has a carrier plate 12 which may be displaced along several coordinate directions x, y and z by means of conventional displacement units (not shown).

Carrier plate 12 is provided with a plurality of recesses 14, each being adapted to the shape of the workpieces to be manufactured. In the described embodiment each recess 14 is connected to a duct 15 at its rear side. For holding workpieces 16 within recesses 14, ducts 15 are connected to a duct system 18. Duct system 18, in turn, is connected to a vacuum connector 19. By means of a vacuum control display 20 the pressure within duct system 18 may be monitored.

If all of the recesses 14 are provided with corresponding workpieces 16, workpieces 16 may be held, i.e., attracted to recesses 14 by simply applying a vacuum to duct system 18. If, however, one or more of the recesses 14 are not provided with a corresponding workpiece 16 due to a malfunction of the machine, the vacuum within duct system 18 will be affected because in the respective recess 14 the corresponding duct 15 of duct system 18 is connected to ambient pressure. In this case vacuum control display 20 will generate an error signal because no sufficient vacuum may buildup within duct system 18. For that purpose vacuum control display 20 is connected to an alarm system (not shown).

Figure 2:
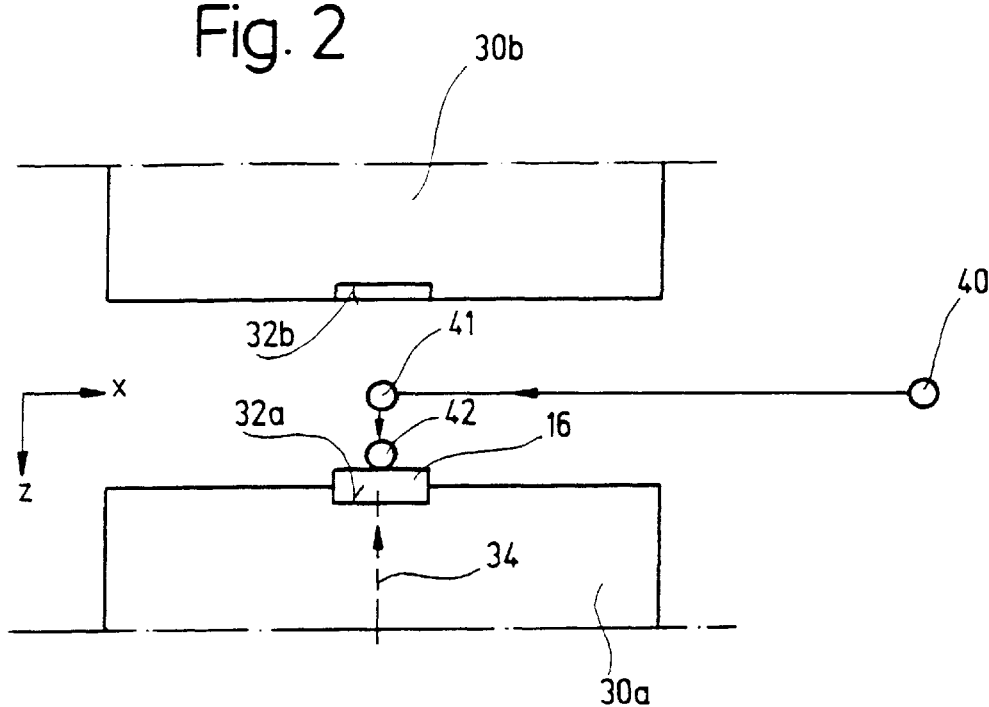
FIG. 2 is a highly schematic top elevational view on an opened mold of a plastic material injection molding machine for illustrating a first sequence of operating steps.

FIG. 2 shows a top elevational view of two highly schematic mold portions 30a, 30b being each equipped with cavities 32a, 32b.

Mold portions 30a, 30b are in their opened state. Cavities 32a, 32b had been filled with plastic material before. The arrangement is such that the injected workpiece 16 is located within cavity 32a of mold portion 30a. However, this is to be understood only as an example.

For demolding workpiece 16 from mold 30a, 30b, a handling system having a workpiece carrier system 10 will be inserted into the gap between mold portions 30a, 30b laterally. Mold portions 30a, 30b are offset from each other by a relatively large opening stroke $z_1$, which, during the later automatic operation of the machine may be reduced to $z_2$.

The displacement starts from a first position 40 being laterally offset from mold portions 30a, 30b. Workpiece carrier system 10 now enters in a -x direction between mold portions 30a, 30b until it reaches a second position 41. From second position 41 workpiece carrier system 10 is displaced in the z direction until a third position 42. In that third position 42 workpiece 16 is transferred. For that purpose workpiece 16 is either gripped by workpiece carrier system 10 or is ejected from the corresponding mold portion 30a by means of ejectors, as indicated in FIG. 2 by arrow 34.

Figure 3:
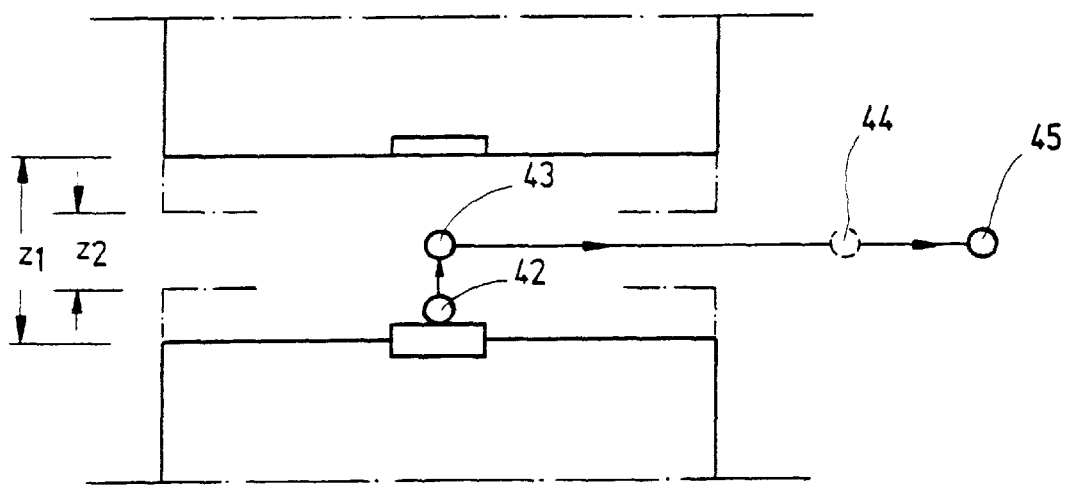
FIG. 3 is a view similar to that of FIG. 2, however, for illustrating a second sequence of operating steps.

FIG. 3 shows that workpiece carrier system 10 is now displaced in the -z direction to a fourth position 43 and is then displaced along the x directing out of mold portions 30a, 30b to a fifth position 44 (optional) and, finally, to a sixth position 45 being preferably identical to first position 40.

This sequence of displacement steps is known per se in the prior art, however, is solely utilized for unmolding and unloading, respectively, of workpieces during the nominal operation of a plastic material injection molding machine being operated at a nominal high operating speed.

Figure 4:
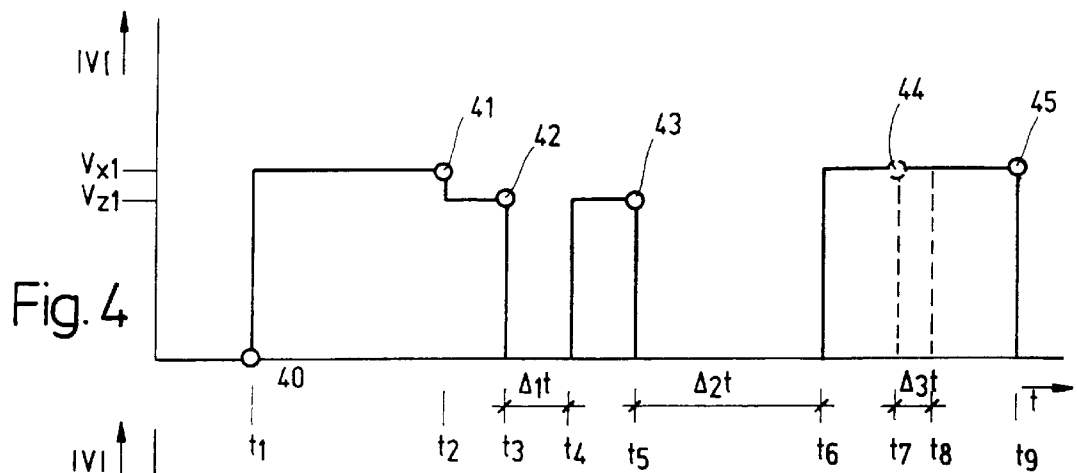
FIG. 4 is a velocity-/time diagram for illustrating a first phase of the method according to the present invention.

The particular feature of the method according to this invention is that this sequence of displacement steps is also used during the setting up of plastic material injection-molding machine, i.e., starting from the first test cycle and serving, initially, only for testing the operation of the injection process in the machine. For that purpose, the sequence of displacement steps is somewhat modified with respect to the time sequence, as will now be explained together with FIGS. 4–6:

FIG. 4 shows the absolute value of velocity v of workpiece carrier system 10 vs. time t.

As one can see, workpiece carrier system 10 enters the gap between the mold portions from the first position 40 on at $t_1$ with a velocity $v_{x1}$ until second position 41 is attained at $t_2$. The subsequent displacement step in z direction is usually effected at reduced speed $v_{z1}$, until third position 42 is attained at $t_3$. This portion of the displacement steps between $t_2$ and $t_3$ may, of course, be deleted, if the workpieces are transferred to workpiece carrier system 10, having entered laterally, by appropriate means incorporated into the mold.

For demolding or transferring, respectively, of workpiece 16 a time interval $\Delta_1 t$ is provided from $t_3$ to $t_4$. Time interval $\Delta_1 t$ depends from the particular transfer or demolding mechanism and may, in an extreme case, be almost zero.

As soon as workpiece 16 has been picked up by workpiece carrier system 10, workpiece carrier system 10 will be displaced back from third position 42 at $t_4$ into fourth position 43 (cf. FIG. 3). Fourth position 43 is attained at $t_5$.

From $t_5$ on a second time interval $\Delta_2 t$ is provided during which workpiece carrier system 10 is held stationary in fourth position 43. The operator of the machine may now inspect all of the workpieces 16 comprised in workpiece carrier system 10 and may determine whether workpieces 16 are complete and are of a predetermined quality. From FIG. 1 one can easily see that this inspection may be conducted relatively quickly because all of the workpieces 16 are regularly arranged on carrier plate 12 of workpiece carrier system 10, for example in the cartesian pattern as shown.

As soon as time interval $\Delta_2 t$ has lapsed, workpiece carrier system 10 will again be displaced in an outward direction from $t_6$ on until fourth position 43 in x direction has been reached. In some instances it may be desired to conduct a further control For that purpose workpiece carrier system 10 may again be held stationary for a short period of time in an intermediate position, fifth position 44 at $t_7$, for a time interval of $\Delta_3 t$. This supplemental control may be effected e.g., by means of sensors which, due to the available space required may not be operated within the narrow air gap between mold portions 30a, 30b. A control of the applied vacuum in duct system 18 may also be effected in intermediate position 44.

As soon as this optional further time interval $\Delta_3 t$ has lapsed at $t_8$, workpiece carrier system 10 will be further displaced outwardly until sixth position 45, the terminal position, is attained.

In FIG. 4 the velocities in x direction are designated as $v_{x1}$ and the velocities in z direction are designated $v_{z1}$. It goes, however, without saying that the depicted velocity profiles shall be understood only as examples and may, of course, be substituted by nonlinear profile or by otherwise varied profiles, as long as the break as exemplified by time interval $\Delta^2 t$ is provided.

As soon as the first cycle is completed, as described before, and the inspection of the workpiece has shown that further adjustments have to be made on the machine, such adjustments will be made by the operator and a second such test cycle according to FIG. 4 will be conducted. This sequence is repeated as many times as are required until all of the workpieces 16 in workpiece carrier system 10 are determined to be of the desired predetermined quality.

Figure 5:
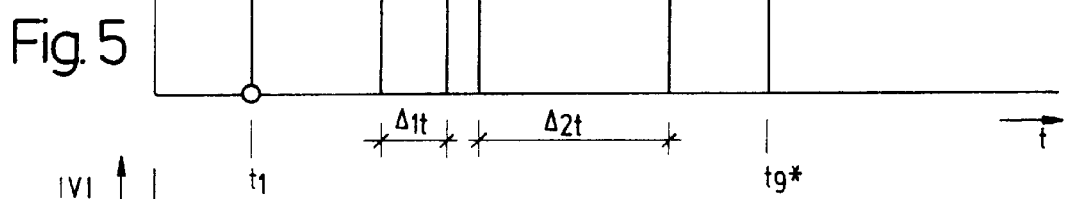
FIG. 5 is a diagram, similar to that of FIG. 4, however, for illustrating an intermediate phase of the method according to the present invention.

As soon as this is the case, an intermediate phase according to FIG. 5 may be set. Accordingly, only the operating speed, i.e., the speed of displacement of workpiece carrier system 10 in x and z direction is increased. This is indicated in FIG. 5 by increased velocities $v_{x2}$ and $v_{z2}$. The rest of the time sequence remains unaltered, insofar as the required time intervals $\Delta_1 t$ and $\Delta_2 t$ have remained unchanged. The entire cycle time from $t_1$ to (now) $t_9^*$ is, of course, reduced because the travel times in x and z directions have been reduced, too.

Figure 6:
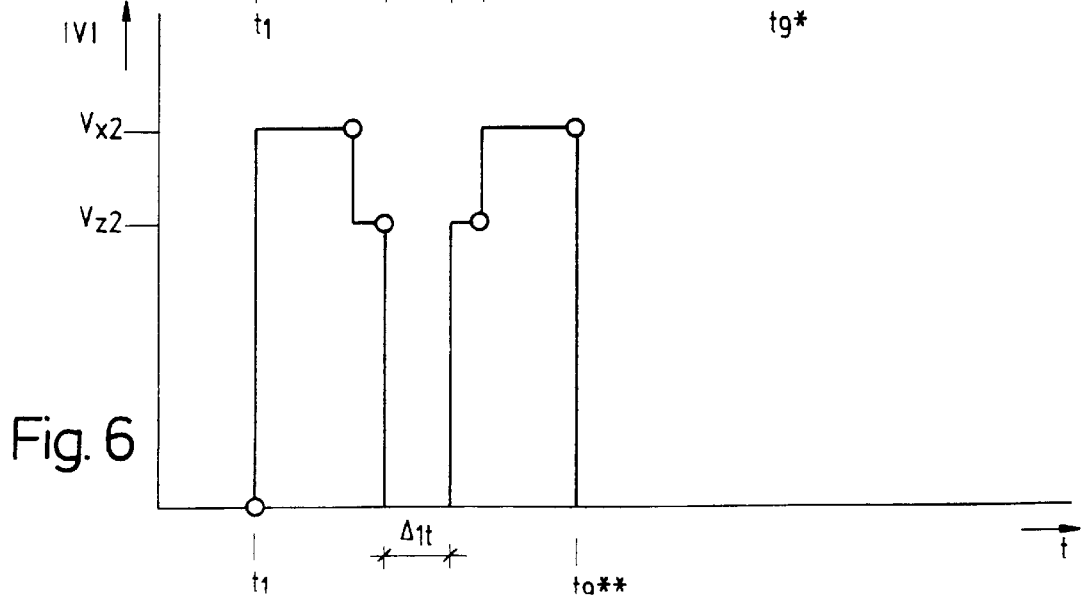
FIG. 6 is a diagram, similar to that of FIGS. 4 and 5, however, for illustrating a second phase of the method according to the present invention.

In case the operator determines that after the completion of this intermediate phase during one or several cycles no malfunctions occur, he may switch to the automatic production mode as shown in FIG. 6.

As can easily be seen, there is no more inspection interval $\Delta_2 t$ in FIG. 6 so that the entire cycle time is again reduced from $t_1$ to (now) $t_9^{**}$.

It goes without saying that several changes may be made to the claimed method. For example, one can operate the machine according to FIG. 6 by setting velocities $v_{x2}$ and $v_{z2}$ to be initially still well below the maximum admissible operating speed. Only if after a certain period of N cycles it is determined (of U.S. Pat. No. 5,425,905 mentioned above) that no malfunction occurs, the velocity may be gradually increased until the maximum admissible operating speed is reached.

What is claimed is:

1. A method for injection-molding workpieces in a mold of an injection-molding machine, the machine being adapted to be operated either at a nominal speed for the production of said workpieces or at a reduced speed during at least one test cycle for the initial setup of the machine, the method comprising the steps of:
   (a) during said test cycle of said machine closing said mold and injecting molten plastic material into cavities of said mold;
   (b) opening said mold at said reduced speed;
   (c) demolding said workpieces from said mold by means of a handling system, said handling system having a workpiece carrier system for supporting said workpieces;
   (d) holding said handling system stationary for a predetermined period of time;
   (e) inspecting said workpieces on said handling system during said period of time for determining whether said workpieces are of a predetermined quality,
   (f) if the inspection shows that said workpieces are not of said predetermined quality, repeating steps (a) through (e);
   (g) generating a signal when said workpieces are of said predetermined quality; and
   (h) continuously operating said machine at said nominal speed.

2. The method of claim 1, wherein said workpiece carriers system is held stationary in a position between two mold portions.

3. The method of claim 2, wherein during said test cycle said mold portions are opened by a first distance from each other and are opened during production at said nominal speed by a second distance from each other, said second distance being smaller than said first distance.

4. The method of claim 1, wherein said workpiece carrier system is held stationary at a position laterally outside of said mold.

5. The method of claim 1, wherein during step (e) said workpieces are inspected optically.

6. The method of claim 1, wherein step (c) comprises attracting said workpieces to said workpiece carrier system by means of an external attracting force, the method comprising the further steps of monitoring said external attracting force.

7. The method of claim 6, comprising attracting said workpieces by means of a vacuum, said vacuum being monitored in a duct system incorporated in said workpiece carrier system.

8. The method of claim 1, wherein said handling system is displaced along a plurality of axes.

9. The method of claim 1, wherein said step (c) comprises ejecting said workpieces from said mold and transferring same to said workpiece carrier system.

10. The method of claim 1, wherein step (f) comprises gradually increasing said reduce speed for subsequent test cycles; said gradually increased speed being smaller than said nominal speed.

11. A method for injection-molding workpieces in a mold of an injection-molding machine, the machine being adapted to be operated either at a nominal speed for the production of said workpieces or at a reduced speed during at least one test cycle for the initial setup of the machine, the method comprising the steps of:
   a. during said test cycle of said machine closing mold portions of said mold and injecting molten plastic material into cavities of said mold portions;
   b. opening said mold at said reduced speed by a predetermined opening stroke until a gap is formed between said mold portions;
   c. inserting a handling system between said mold portions, said handling system having a workpiece carrier system for receiving and supporting said workpieces;
   d. demolding said workpieces by transferring said workpieces from said cavities to said workpiece carrier system;
   e. holding said workpieces on said handling system for a predetermined period of time;
   f. inspecting said workpieces on said workpiece carrier system during said period of time for determining whether said workpieces are of a predetermined quality;
   g. if the inspection shows that said workpieces are not of said predetermined quality, repeating said steps (a) through (f);
   h. generating a signal when said workpieces are of said predetermined quality; and
   i. continuously operating said machine at said nominal speed.

12. A method as defined in claim 11, wherein the step of holding said workpieces in the handling system further comprises the step of holding said handling system stationary for said predetermined period of time.

* * * * *